Oct. 24, 1939.   L. G. S. BROOKER   2,177,401
DYE FROM THIO-OXAZOLEDIONES
Filed Aug. 13, 1936

Fig.1.
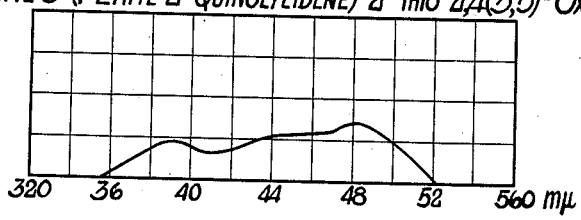
3-Ethyl-5-(1-Ethyl-2-Quinolylidene)-2-Thio-2,4(3,5)-Oxazoledione Fig.2.
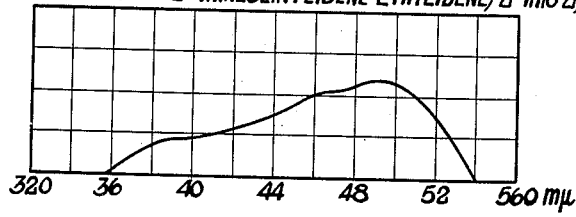
3-Ethyl-5-(3-Methyl-2-Thiazolinylidene-Ethylidene)-2-Thio-2,4(3,5)-Oxazoledione Fig.3.
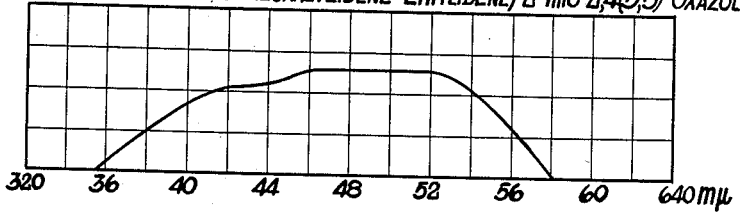
3-Ethyl-5-(2-Ethyl-1-Benzoxazylidene-Ethylidene)-2-Thio-2,4(3,5)-Oxazoledione Fig.4.
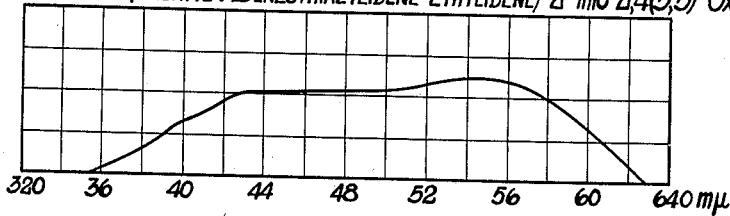
3-Ethyl-5-(2-Ethyl-1-Benzothiazylidene-Ethylidene)-2-Thio-2,4(3,5)-Oxazoledione Fig.5.
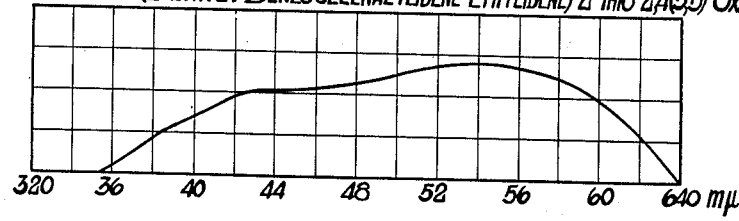
3-Ethyl-5-(2-Ethyl-1-Benzoselenazylidene-Ethylidene)-2-Thio-2,4(3,5)-Oxazoledione Leslie G. S. Brooker,
INVENTOR:
BY N. M. Perrins
Daniel J. Mayne
ATTORNEYS.

Patented Oct. 24, 1939

2,177,401

UNITED STATES PATENT OFFICE

2,177,401

DYE FROM THIO-OXAZOLEDIONES

Leslie G. S. Brooker, Rochester, N. Y., assignor, by mesne assignments, to Eastman Kodak Company, Rochester, N. Y., a corporation of New Jersey Application August 13, 1936, Serial No. 95,927
In Great Britain November 15, 1935

15 Claims. (Cl. 260—240)

This invention relates to dyes from thio-oxazolediones. More particularly, this invention relates to merocyanine dyes from thio-2,4(3,5)-oxazolediones and to a process for preparing the same. These new merocyanine dyes serve to alter the sensitivity of photographic emulsions.

This application is a continuation-in-part of my copending application, Serial No. 752,036, filed November 8, 1934 (now United States Patent 2,078,233, dated April 27, 1937) which is in turn a continuation-in-part of my copending application, Serial No. 739,502, filed August 11, 1934. In my copending application Serial No. 752,036, are described photographic emulsions containing photographic sensitizing dyes characterized by the following grouping:

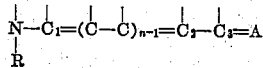

wherein A represents a divalent atom, such as oxygen or sulfur, $n$ represents a positive integer, R represents an alkyl group, the carbon atom $C_1$ and the nitrogen atom are situated in a heterocyclic ring system and the carbon atoms $C_2$ and $C_3$ are situated in another heterocyclic ring system. In my copending application Serial No. 752,036 these dyes are referred to as N-alkyl-heterocyclylidene, N - alkyl - heterocyclylidene - ethylidene and N - alkyl-heterocyclylidene-butenylidene derivatives of heterocyclic compounds containing a reactive methylene group, depending upon whether $n$ represents 1, 2 or 3 etc. It has recently been proposed to refer to this new class of dyes under the name "merocyanine". Accordingly, when $n$, in the above formula represents one, the dyes are conveniently referred to as "simple merocyanines", when $n$ represents two, as "merocarbocyanines" and when $n$ represents three as "merodicarbocyanines", etc.

My copending application Serial No. 752,036 describes specifically photographic emulsions containing simple merocyanines, merocarbocyanines and merodicarbocyanines derived from rhodanines, 5-thiopyrazolones, 2,4,6-triketohexahydropyrimidines and 2 - thionaphthenones (thioindoxyls). The instant application is directed to merocyanine dyes from thio-2,4(3,5)-oxazolediones. These new merocyanine dyes can be represented by the following general formulas:

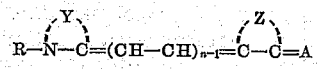

and

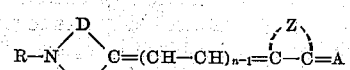

wherein A represents a divalent atom, such as oxygen or sulfur, D represents a vinylene or phenylene group, $n$ represents a positive integer not greater than three, R represents an alkyl group, Y represents the non-metallic atoms necessary to complete a five-membered or six-membered heterocyclic nucleus, such as an oxazole nucleus (for example oxazole, benzoxazole or naphthoxazole), a thiazole nucleus (for example thiazole, benzothiazole or naphthothiazole), a selenazole nucleus (for example selenazole or benzoselenazole), a thiazoline nucleus, a selenazoline nucleus, a quinoline nucleus, a benzoquinoline nucleus or a pyridine nucleus and Z represents the non-metallic atoms necessary to complete a thio-2,4(3,5)-oxazoledione nucleus.

These new simple merocyanine dyes, where $n$ represents one, can be prepared by condensing a cyclammonium quaternary salt, such as an oxazole, a thiazole, a selenazole, a thiazoline, a selenazoline, a pyridine or a quinoline quaternary salt containing a mercapto group in the alpha or gamma position, i. e. one of the so-called reactive positions, with a thio-2,4(3,5)-oxazoledione, containing a nuclear reactive methylene group, i. e., a nuclear methylene group adjacent to a nuclear carbonyl or thiocarbonyl group, advantageously in the presence of a basic condensing agent. The reaction can be illustrated by reference to the specific condensation of 1-phenylthiobenzothiazole ethiodide with 2-thio-2,4(3,5)-oxazoledione in the presence of triethylamine.

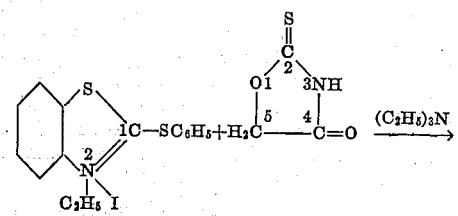

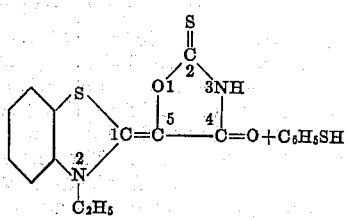

Such a dye is called 5-(2-ethyl-1-benzothiazylidene)-2,4(3,5)-oxazoledione. In carrying out this type of condensation, I have found it advantageous to employ strong tertiary organic bases as condensing agents, though inorganic condensing agents such as sodium carbonate or potassium hydroxide can be used. Heating accelerates the reaction.

The following examples serve to illustrate the procedure employed in preparing these new dyes where $n$ represents one. However, I do not intend that these examples limit my invention.

EXAMPLE 1.—*3-ethyl-5-(2-ethyl-1-benzothiazylidene)-2-thio-2,4(3,5)-oxazoledione*

0.48 g. (1 mol.) of 3-ethyl-2-thio-2,4(3,5)-oxazoledione (Ahlquist, J. Prakt. Chem. 99, 45 (1919)), 1.1 g. (1 mol.) of 1-methylthiobenzothiazole ethiodide and 0.35 g. (1.05 mol.) were heated on the steam bath under reflux for about 15 minutes with absolute ethyl alcohol (15 cc.). The dye separated from the cooled reaction mixture. After two recrystallizations from glacial acetic acid it was obtained as pale yellow crystals having a melting point of 246–248° C. The dye can be represented by the following formula:

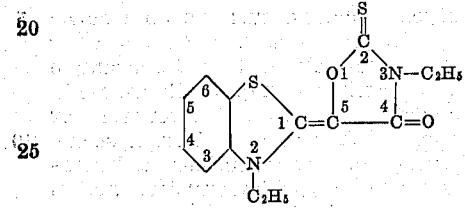

EXAMPLE 2.—*3-ethyl-5-(2-ethyl-1-benzoxazylidene)-2-thio-2,4(3,5)-oxazoledione*

1.65 g. (1 mol.) of 1-methylthiobenzoxazole and 1.54 g. (1 mol.) of ethyl sulfate were heated together gently over a free flame until ebullition was attained. The reaction mixture was cooled and to it was added 1.45 g. (1 mol.) of 3-ethyl-2-thio-2,4(3,5)-oxazoledione, 0.9 g. (1 mol.) of anhydrous sodium acetate and 25 cc. of acetic anhydride. This mixture was heated to boiling for 5 minutes. On cooling yellow crystals separated out. After two recrystallizations from glacial acetic acid, the dye was obtained as pale yellow crystals melting at 194–197° C. with decomposition.

EXAMPLE 3.—*3-ethyl-5-(1-ethyl-2-quinolylidene)-2-thio-2,4(3,5)-oxazoledione*

0.7 g. (1 mol.) of 3-ethyl-2-thio-2,4(3,5)-oxazoledione, 2.0 g. (1 mol.) of 2-phenylthio-quinoline ethiodide and 0.53 g. (1.05 mol.) were heated on the steam bath under reflux for 15 minutes with absolute ethyl alcohol (20 cc.). The dye separated from the cooled reaction mixture. After two recrystallizations from methyl alcohol, the dye was obtained as orange prisms having a melting point of 201–202° C.

EXAMPLE 4.—*3-ethyl-5-(1-methyl-2(1)-β-naphthoxazylidene)-2-thio-2,4(3,5)-oxazoledione*

2-mercapto-β-naphthoxazole was prepared by heating on the steam bath 9.8 g. (1 mol.) of 1-amino-2-naphthol hydrochloride with 19.0 g. (excess) of carbon disulfide in the presence of 5.0 g. (1 mol.) of triethylamine and 16 cc. of pyridine for about 24 hours. The excess carbon disulfide was then distilled off and water was added to the reaction mixture to precipitate the product. After recrystallization from methyl alcohol, the mercapto compound was obtained as white crystals, melting at 263–264° C.

2-methylthio-β-naphthoxazole was prepared by heating on the steam bath 20.1 g. (1 mol.) of 2-mercapto-β-naphthoxazole with 17.7 g. (1.25 mol.) of methyl iodide in a solution of 6.6 g. (1 mol.) of potassium hydroxide (85%) in absolute ethyl alcohol for about 2.5 hours. The alcohol was distilled off and the residue extracted with ether. The ether solution was dried and upon evaporation yielded the methylthio derivative as an oil. This was distilled under reduced pressure (3 mm.) giving a yellow distillate which solidified on standing. After recrystallization from ligroin, the methylthio derivative was obtained as white crystals, melting at 68–70° C.

1.08 g. (1 mol.) of 2-methylthio-β-naphthoxazole and 0.63 g. (1 mol.) of dimethyl sulfate were heated on the steam bath for about 2 hours. To this reaction mixture was added 0.73 g. (1 mol.) of 3-ethyl-2-thio-2,4(3,5)-oxazoledione and 0.53 g. (1.05 mols.) of triethylamine and 25 cc. of absolute ethyl alcohol. The whole was heated for about 10 minutes on the steam bath. The dye separated from the cooled reaction mixture. After recrystallization from methyl alcohol, it was obtained as pale yellow crystals, melting at 187–189° C. with decomposition. The dye can be represented by the following formula:

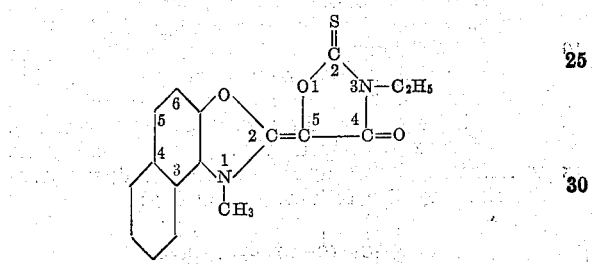

The 3-ethyl-2-thio-2,4(3,5)-oxazoledione used in the above three examples can be replaced by 2-thio-2,4(3,5)-oxazoledione, or other thio-2,4(3,5)-oxazolediones or their nitrogen substituted derivatives. I have found the 3-alkyl derivatives especially advantageous. These oxazolediones can be prepared as described by Ahlquist in J. Prakt. Chem. 99, 45 (1919).

The 1-methylthiobenzothiazole, 1-methylthio-β-naphthoxazole and 2-phenylthioquinoline quaternary salts can be replaced by other quaternary salts such as metho-p-toluenesulfonates, dimethyl sulfates, perchlorates or other alkyl halides for example. Instead of the methylthio and phenylthio other mercapto derivatives can be used, for example n-butylthio, p-chlorophenylthio, β-naphthylthio, benzothiazylthio or 5-pyrazolonylthio. Instead of the mercapto derivatives of benzothiazole and quinoline quaternary salts, mercapto derivatives of other cyclammonium quaternary salts can be used, for example, alkylthio, arylthio or heterocyclothio derivatives of thiazole, oxazole, thiazoline, thiazole, naphthothiazole, selenazole, selenazoline, benzoselenazole or pyridine quaternary salts. Such dyes and a process for the preparation thereof are described in the copending application of Leslie G. S. Brooker and Russel H. Van Dyke, Serial No. 29,917, filed July 5, 1935.

These new dyes, where $n$ represents two, can be prepared by condensing a cyclammonium quaternary salt, such as an oxazole, a thiazole, a thiazoline, a selenazole, a selenazoline, a pyridine or a quinoline quaternary salt, containing a β-anilinovinyl group in the alpha or gamma, i. e., one of the so-called reaction positions, with a thio-2,4(3,5)-oxazoledione, advantageously in the presence of an acid binding agent. The reaction can be illustrated with particular reference to the specific condensation of 1-(β-anilinovinyl)-benzothiazole ethiodide with 2-thio- 2,4(3,5)-oxazoledione, in the presence of triethylamine.

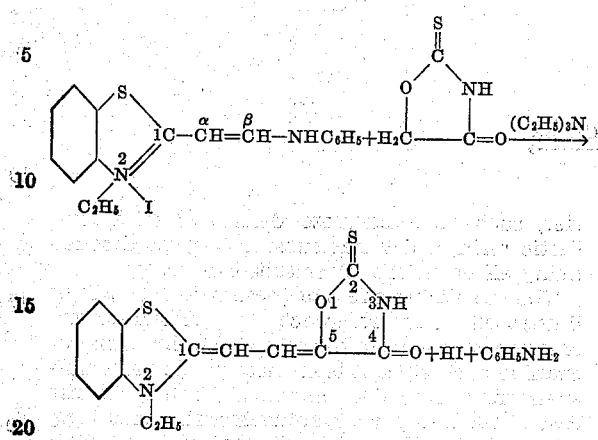

Such a dye is called 5-(2-ethyl-1-benzothiazylidene-ethylidene)-2-thio-2,4(3,5)-oxazoledione. The acetylated β-anilino derivative can be advantageously employed in condensations of this type. The reaction can also be carried out in the presence of other strong organic bases such as piperidine, or an inorganic base such as sodium hydroxide or sodium carbonate. Sodium acetate can also be used as condensing agent.

The following examples serve to illustrate the procedure employed in preparing these new dyes where $n$ represents two. However, I do not intend that these examples limit my invention in any manner.

EXAMPLE 5.—5-(3-methyl-2-thiazolinylidene-ethylidene)-2-thio-2,4(3,5)-oxazoledione 1.7 g. (1 mol.) of 2-(β-anilinovinyl)-thiazoline methiodide, 0.6 (1 mol.) of 2-thio-2,4(3,5)-oxazoledione and 0.53 g. (1.05 mols.) of triethylamine were refluxed in 20 cc. of absolute ethyl alcohol for about 15 minutes. The dye separated from the cooled reaction mixture. After two recrystallizations from methyl alcohol, the dye was obtained as orange brown granular crystals. The dye can be represented by the following formula:

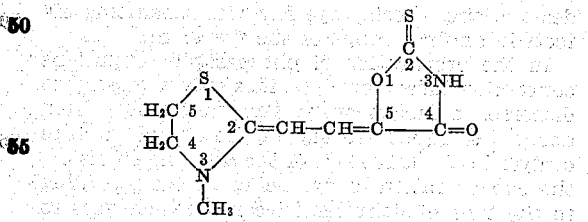

EXAMPLE 6.—5-(2-ethyl-1-benzoxazylidene-ethylidene)-2-thio-2,4(3,5)-oxazoledione 0.6 g. (1 mol.) of 2-thio-2,4(3,5)-oxazoledine, 2.2 g. (1 mol.) of 1-(β-acetanilidovinyl)-benzoxazole ethiodide and 1.06 g. (1.05 mols.) of triethylamine were refluxed for about 15 minutes in absolute ethyl alcohol (15 cc.). The dye separated from the cooled reaction mixture. After recrystallization from acetic acid the dye was obtained as reddish-brown crystals with pale blue reflex.

EXAMPLE 7.—3-ethyl-5-(2-ethyl-1-benzoxazylidene-ethylidene)-2-thio-2,4(3,5)-oxazoledione 0.7 g. (1 mol.) of 3-ethyl-2-thio-2,4(3,5)-oxazoledione, 2.2 g. (1 mol.) of 1-(β-acetanilidovinyl)-benzoxazole ethiodide and 1.06 g. (1.05 mols.) of triethylamine were refluxed in absolute ethyl alcohol (20 cc.) for 15 minutes. The dye separated from the cooled reaction mixture. After two recrystallizations from glacial acetic acid, the dye was obtained as yellow-orange needles. The dye can be represented by the following formula:

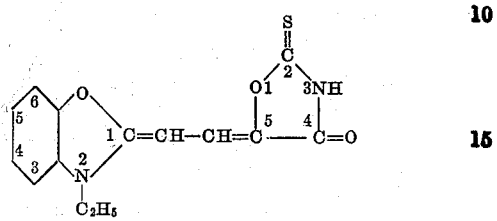

EXAMPLE 8.—3-ethyl-5-(2-ethyl-1-benzothiazylidene-ethylidene)-2-thio-2,4(3,5)-oxazoledione 0.7 g. (1 mol.) of 3-ethyl-2-thio-2,4(3,5)-oxazoledione, 2.25 g. (1 mol.) of 1-(β-acetanilidovinyl)-benzothiazole ethiodide and 0.53 g. (1.05 mols.) of triethylamine were refluxed in absolute ethyl alcohol (20 cc.) for about 15 minutes. The dye separated from the cooled reaction mixture. After two recrystallizations from glacial acetic acid, the dye was obtained as crimson crystals melting at 243–245° C. with decomposition.

EXAMPLE 9.—3-ethyl-5-(2-ethyl-1-benzoselenazylidene-ethylidene)-2-thio-2,4(3,5)-oxazoledione 0.36 g. (1 mol.) of 3-ethyl-2-thio-2,4(3,5)-oxazoledione, 1.25 g. (1 mol.) of 2-(β-acetanilidovinyl)-benzoselenazole ethiodide and 0.26 g. (1.05 mols.) of triethylamine were refluxed for about 15 minutes with absolute ethyl alcohol (15 cc.). The dye separated from the cooled reaction mixture. After two recrystallizations from glacial acetic acid, the dye was obtained as crimson crystals melting at 219–220° C. with decomposition. The dye can be represented by the following formula:

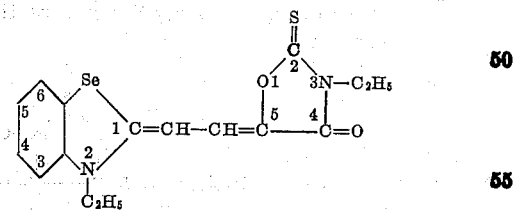

In a similar manner β-anilino derivatives of thiazole, naphthothiazole, quinoline, pyridine, etc. quaternary salts can be condensed with thio-2,4(3,5)-oxazoledione, 3-alkylthio-2,4(3,5)-oxazolediones being particularly advantageous.

These new dyes, where $n$ represents three, can be prepared by condensing a cyclammonium quaternary salt, such as an oxazole, a thiazole, a thiazoline, a selenazole, a selenazoline, a pyridine or a quinoline quaternary salt, containing a ω-anilino-$\Delta^{1,3}$-butadienyl group in the alpha or gamma, i. e., one of the so-called reactive positions, with a thio-2,4(3,5)-oxazoledione advantageously in the presence of a basis condensing agent. The reaction can be illustrated by reference to the specific condensation of 1-(ω-anilino-$\Delta^{1,3}$-butadienyl)-benzothiazole ethiodide with 3-ethyl-2-thio-2,4(3,5)-oxazoledione, in the presence of triethylamine.

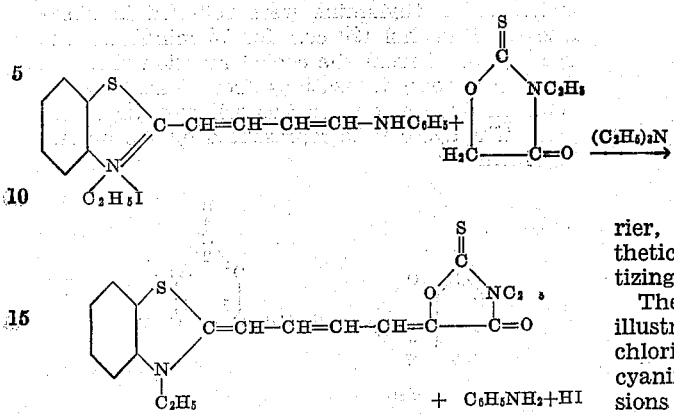

This dye is called 3-ethyl-5-(2-ethyl-1-benzothiazylidene-butenylidene)-2-thio-2-4(3,5)-oxazoledione. In carrying out this type of condensation I have found it advantageous to employ the acetylated ω-anilino derivative. The ω-anilino-γ-bromo-Δ$^{1,3}$-butadienyl derivative can also be used. The reaction can also be carried out in the presence of basic condensing agents such as sodium carbonate or sodium acetate and acetate anhydride. Heat accelerates the condensations.

The following example serves to illustrate the procedure employed in preparing these new dyes where $n$ represents three. However, I do not intend that this example limit my invention in any manner.

EXAMPLE 10.—*3-ethyl-5-(2-ethyl-1-benzothiazylidene-butenylidene)-2-thio-2,4(3,5)-oxazoledione*

1.2 g. (1 mol.) of 1-(β-acetanilido-Δ$^{1,3}$-butadienyl)-benzothiazole ethiodide, 0.4 g. (1 mol.) of 3-ethyl-2-thio-2,4 (3,5)-oxazoledione and 0.25 g. (1 mol.) of triethylamine were refluxed in 10 cc. absolute ethyl alcohol for about 10 minutes. The dye separated from the cooled reaction mixture. After recrystallization from glacial acetic acid, the dye was obtained as minute, dark, shiny green crystals. The dye can be represented by the following formula:

In place of the butadienyl derivative of benzothiazole, the butadienyl derivatives of benzoxazole, naphthothiazole, quinoline, thiazoline, benzoselenazole or the like can be used.

These new merocyanine dyes show a novel sensitizing action in photographic silver salt emulsions, particularly silver chloride and silver bromide emulsions. Accordingly, my invention is particularly directed to the customarily employed silver halide emulsions. However, the light-sensitive material employed in the emulsions of my invention can be any light-sensitive silver salt alone or combined with another light-sensitive silver salt, such as a silver halide. My invention is further particularly directed to the customarily employed gelatin emulsions, gelatin being the carrier or medium in which the light-sensitive salt is suspended. However, any other suitable carrier, such as a cellulose derivative or a synthetic resin, which has substantially no desensitizing effect on the silver salt, can be used.

The sensitizing effect of these new dyes will be illustrated with reference to gelatino-silver-chloride emulsions in the case of the simple merocyanine dyes, since it is in these particular emulsions that these dyes are most useful. In the case of the merocarbocyanine dyes the sensitizing effect will be illustrated with reference to gelatino-silver-chloride and bromide emulsions. The merodicarbocyanines are useful in either chloride or bromide emulsions. The sensitizing effects will all be illustrated using the dyes derived from 3-alkyl-2-thio-2,4(3,5)-oxazoledione, as these dyes are the most useful. In particular, the merocarbocyanine dyes derived from 3-alkyl-2-thio-2,4 (3,5)-oxazoledione are most useful and the illustrations will be directed to these largely in order to give the most useful information to the art. Fig. 1 of the accompanying drawing depicts the range of sensitivity of a chloride emulsion containing 3-ethyl-5-(1-ethyl-2-quinolylidene-ethylidene)-2-thio-2,4 (3,5) oxazoledione. Fig. 2 depicts the range of sensitivity of a chloride emulsion containing 3-ethyl-5-(3-methyl-2-thiazolinylidene-ethylidene)-2-thio-2,4 (3,5)-oxazoledione. Fig. 3 depicts the range of sensitivity of a bromide emulsion containing 3-ethyl-5-(2-ethyl-1-benzoxazylidene-ethylidene)-2-thio-2,4 (3,5)-oxazoledione. Fig. 4 depicts the range of sensitivity of a bromide emulsion containing 3-ethyl-5-(2-ethyl-1-benzothiazylidene-ethylidene)-2-thio-2,4 (3,5)-oxazoledione. Fig. 5 depicts a bromide emulsion containing 3-ethyl-5-(2-ethyl-1-benzoselenazylidene-(ethylidene)-2-thio-2,4 (3,5)-oxazoledione.

Some of the herein disclosed dyes have small desensitizing effects, together with sensitizing effects in another range of the spectrum.

In the preparation of photographic emulsions containing these new dyes, it is only necessary to disperse, homogeneously and uniformly, from about 5 to about 100 mg. of the dye or mixture of dyes in about 1000 cc. of the flowable emulsion, the concentration of dye being varied according to the type of light-sensitive salt which goes to make up the emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol acetone or pyridine and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogeneously dispersed. With the more powerful of these new sensitizing dyes 10 to 20 mg. of dye per 1000 cc. of emulsion suffice to produce the maximum sensitizing effect with the ordinary gelatino-silver-halide emulsions. The above statements are only illustrative and not to be understood as limiting my invention in any sense, as it will be apparent that these dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver salt emulsion whereby the dye exerts a sensitizing effect upon the emulsions as well as a photographic element comprising a support, ordinarily transparent, upon which the light-sensitive emulsion is coated or spread and permitted to set or dry.

The herein disclosed dyes, particularly the simple merocyanines and the merocarbocyanines, are useful in the construction of light filters, the simple merocyanines absorbing light of the shorter wavelengths and some ultraviolet. The merocarbocyanines are useful as coloring matters for textiles, particularly cellulose acetate silk or the like. The term "dye" as used in connection with the simple merocyanines is a loose usuage as these substances are often of a pale color.

It is to be understood that the herein disclosed dyes probably exist in two forms which for one group of my new dyes can be illustrated as follows:

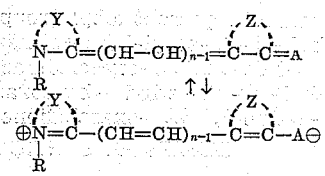

As illustrated these forms are interconvertible one into the other, i. e., the forms are virtual tautomers.

What I claim as my invention and desire to be secured by Letters Patent of the United States of America is:

1. A dye characterized by a formula selected from the following two formulas:

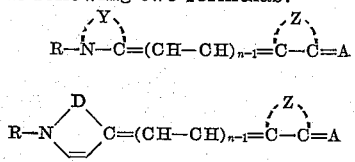

wherein A represents an atom selected from the group consisting of oxygen and sulfur atoms, D represents a radical selected from the group consisting of vinylene and phenylene groups, $n$ represents a positive integer not less than two and not greater than three, R represents an alkyl group, Y represents the non-metallic atoms necessary to complete a heterocyclic nucleus selected from the group consisting of five-membered and six-membered heterocyclic nuclei and Z represents the non-metallic atoms necessary to complete a thio-2,4(3,5)-oxazoledione nucleus.

2. A dye characterized by the following formula:

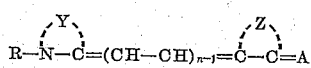

wherein A represents an atom selected from the group consisting of oxygen and sulfur atoms, $n$ represents a positive integer not smaller than two and not greater than three, R represents an alkyl group, Y represents the non-metallic atoms necessary to complete a heterocyclic nucleus selected from the group consisting of five-membered and six-membered heterocyclic nuclei and Z represents the non-metallic atoms necessary to complete a thio-2,4(3,5)-oxazoledione nucleus.

3. A dye characterized by a formula selected from the following two formulas:

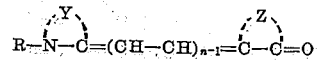

and

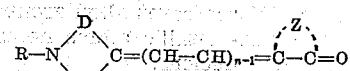

wherein D represents a radical selected from the group consisting of vinylene and phenylene groups, $n$ represents a positive integer not smaller than two and not greater than three, R represents an alkyl group, Y represents the non-metallic atoms necessary to complete a heterocyclic nucleus selected from the group consisting of five-membered and six-membered heterocyclic nuclei and Z represents the non-metallic atoms necessary to complete a thio-2,4(3,5)-oxazoledione nucleus.

4. A dye characterized by the following formula:

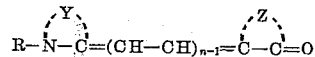

wherein R represents an alkyl group, $n$ represents a positive integer not smaller than two and not greater than three, Y represents the non-metallic atoms necessary to complete a heterocyclic nucleus selected from the group consisting of five-membered and six-membered heterocyclic nuclei and Z represents the non-metallic atoms necessary to complete a thio-2,4(3,5)-oxazoledione nucleus.

5. A dye characterized by a formula selected from the following two formulas:

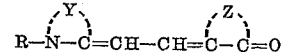

and

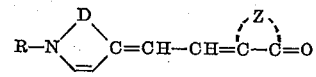

wherein D represents a radical selected from the group consisting of vinylene and phenylene groups, R represents an alkyl group, Y represents the non-metallic atoms necessary to complete a heterocyclic nucleus selected from the group consisting of five-membered and six-membered heterocyclic nuclei and Z represents the non-metallic atoms necessary to complete a thio-2,4(3,5)-oxazoledione nucleus.

6. A dye characterized by the following formula:

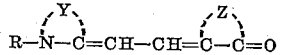

wherein R represents an alkyl group, Y represents the non-metallic atoms necessary to complete a five-membered heterocyclic nucleus and Z represents the non-metallic atoms necessary to complete a thio-2,4(3,5)-oxazoledione nucleus.

7. A dye characterized by the following formula:

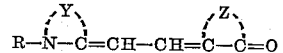

wherein R represents an alkyl group, Y represents the non-metallic atoms necessary to complete an azole nucleus and Z represents the non-metallic atoms necessary to complete a thio-2,4(3,5)-oxazoledione nucleus.

8. A dye characterized by the following formula:

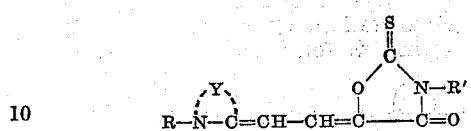

wherein R and R' represent alkyl groups and Y represents the non-metallic atoms necessary to complete an azole nucleus.

9. A dye characterized by the following formula:

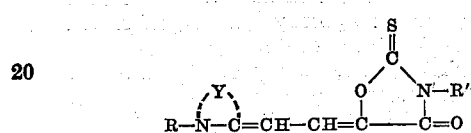

wherein R and R' represent alkyl groups and Y represents the non-metallic atoms necessary to complete a thiazole nucleus.

10. A dye characterized by the following formula:

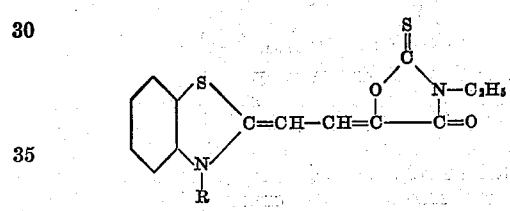

wherein R represents an alkyl group.

11. A dye characterized by the following formula:

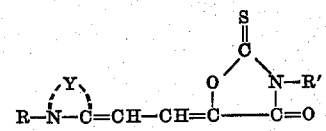

wherein R and R' represent alkyl groups and Y represents the non-metallic atoms necessary to complete an oxazole nucleus.

12. A dye characterized by the following formula:

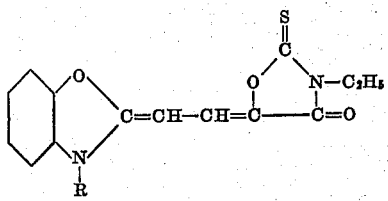

wherein R represents an alkyl group.

13. A dye characterized by the following formula:

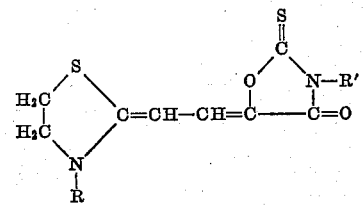

wherein R and R' represent alkyl groups.

14. 3 - ethyl - 5 - (2-ethyl-1-benzothiazylidene-ethylidene)-2-thio-2,4(3,5)-oxazoledione.

15. 3 - ethyl - 5 - (2 - ethyl-1-benzoxazylidene-ethylidene)-2-thio-2,4(3,5)-oxazoledione.

LESLIE G. S. BROOKER.